United States Patent
Joseph et al.

(10) Patent No.: US 9,210,456 B1
(45) Date of Patent: Dec. 8, 2015

(54) METHOD AND SYSTEM FOR DETECTING UNAUTHORIZED USE OF A USER DEVICE USING RECEIVER IDENTIFICATION IN A NETWORK

(75) Inventors: Kuriacose Joseph, Gaithersburg, MD (US); John L. Norin, Redondo Beach, CA (US); Scott D. Casavant, Germantown, MD (US); Yangyang Shi, San Diego, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 478 days.

(21) Appl. No.: 13/413,815

(22) Filed: Mar. 7, 2012

(51) Int. Cl.
*H04N 21/25* (2011.01)
*H04N 21/258* (2011.01)
*H04N 21/418* (2011.01)
*H04L 29/06* (2006.01)

(52) U.S. Cl.
CPC ......... *H04N 21/25* (2013.01); *H04N 21/25816* (2013.01)

(58) Field of Classification Search
None
See application file for complete search history.

(56) References Cited

U.S. PATENT DOCUMENTS

| | | | |
|---|---|---|---|
| 2010/0211793 A1* | 8/2010 | Park et al. | 713/176 |
| 2011/0010735 A1* | 1/2011 | Newell | 725/31 |
| 2012/0128151 A1* | 5/2012 | Boehm et al. | 380/42 |

* cited by examiner

*Primary Examiner* — Mark D Featherstone

(57) ABSTRACT

A system and method for determining unauthorized use of a first user device associated with a local network that includes a plurality of user devices associated with a user account. A comparison module compares a first master identifier determined within the local network and an expected master identifier generated outside the local network. A disable module generates an error signal in response to comparing.

40 Claims, 7 Drawing Sheets

METHOD AND SYSTEM FOR DETECTING UNAUTHORIZED USE OF A USER DEVICE USING RECEIVER IDENTIFICATION IN A NETWORK

TECHNICAL FIELD

The present disclosure relates generally to communicating between a service provider and a user device, and, more specifically, to disabling service of a set top box based upon received master receiver identification associated with a user account.

BACKGROUND

The statements in this section merely provide background information related to the present disclosure and may not constitute prior art.

Satellite programming has become increasingly popular due to the wide variety of content and services available. Typically, a set top box is configured to receive satellite programming in response to conditional access provided through the use of encryption and a conditional access module. When a consumer has proper conditional access credentials, the signals are decrypted so that the output may be viewed by the user.

Satellite and other content invest considerable amounts of money providing user devices such as set top boxes to customers. As technology has changed, the opportunity to share service has increased. Sharing service is an unauthorized use that prevents revenue from being reinvested in a company to improve service and features.

Thus, preventing unauthorized use is important from a business perspective.

SUMMARY

The present disclosure provides a system and method for reducing unauthorized use of set top boxes by comparing a master identifier generated within a network of user devices communicated to the user device from a head end with an expected signal identifier.

In one aspect of the disclosure, a method for determining unauthorized use of a first user device includes generating an expected master identifier for a user account at a head end, communicating the expected master identifier to the first user device of a plurality of user devices associated with an account, receiving the expected master identifier at the first user device, comparing a first master identifier determined within a local network associated with the user account to the expected master identifier and generating an error signal at the first user device in response to comparing.

In a further aspect of the disclosure, a system for determining unauthorized use of a first user device associated with a local network that includes a plurality of user devices associated with a user account. A comparison module compares a first master identifier determined within the local network and an expected master identifier generated at outside the local network. A disable module generates an error signal in response to comparing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
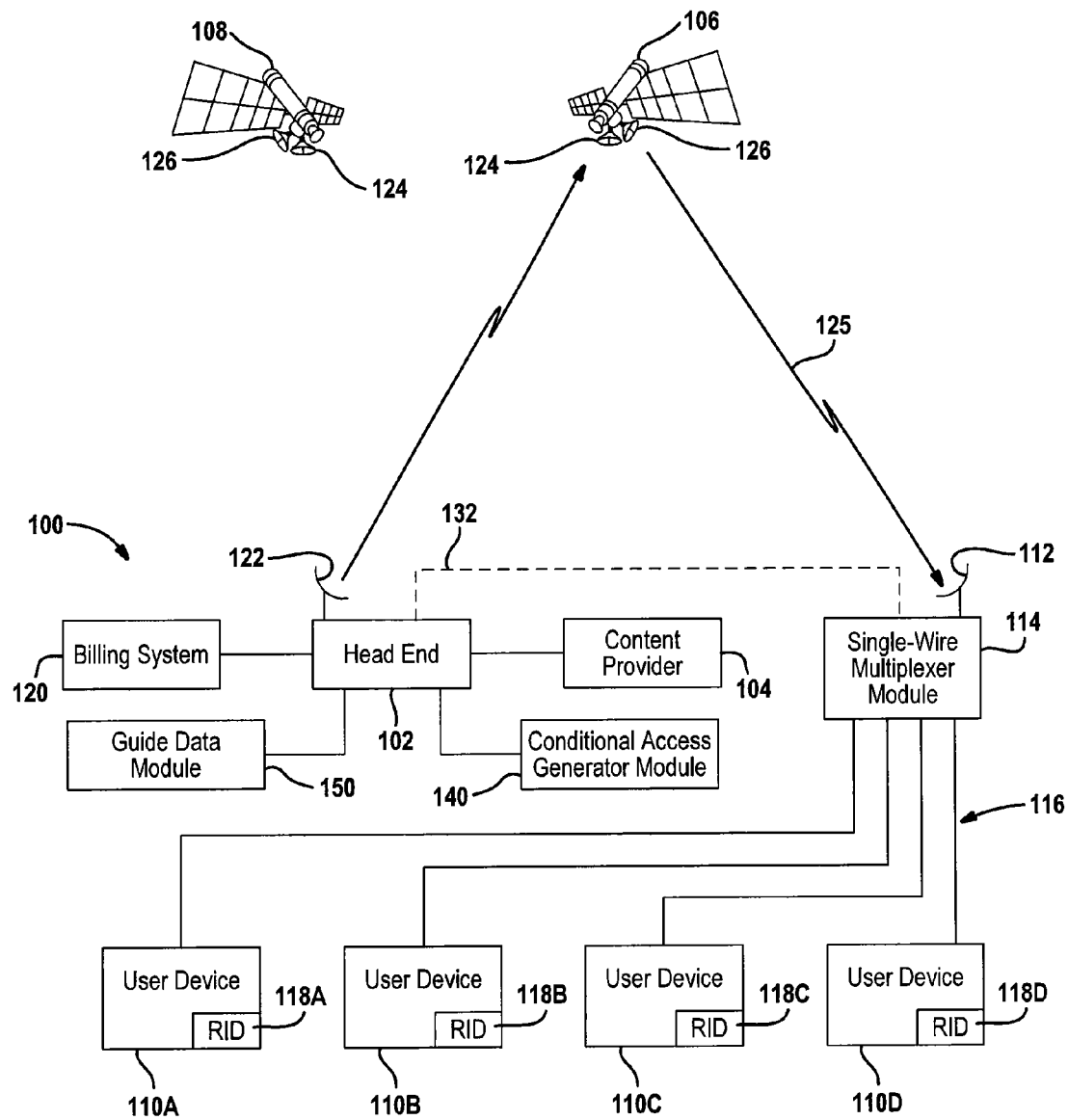
FIG. 1 is a diagrammatic representation of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein.

The following description refers to communicating content, data, control signals, data objects and the like. The content data, control signals, and data objects are communicated electronically using electrical or optical control signals.

Referring now to FIG. 1, a content communication system 100 includes a head end 102 that is used as a processing, security billing and transmission source. Of course, the various functions may be separated. A plurality of content providers, one of which is shown at reference numeral 104 may provide content to the head end 102 for distribution therefrom.

A first satellite 106 and a second satellite 108 may also be incorporated into the system 100. The satellites 106, 108 may be used to communicate different types of data or different portions of various content from the head end 102. The satellites 106, 108 may be a geosynchronous or geo-stationary satellite that, in turn, rebroadcast the information over broad geographical areas on the earth. The satellites 106 and 108 may have inter-satellite communication links for relaying data there between.

The system 100 also includes a plurality of fixed user devices 110A-D which will be collectively referred to with reference numeral 110. The user devices 110 may be integrated receiver/decoders (IRDs) and may be referred to as set top boxes, satellite television set top box or satellite signal receiving set top boxes. The user devices 110 are referred to as fixed user devices because they are typically associated with a display mounted in a stationary position within a home or business. Wireless communications are exchanged between the head end 102 and the user devices 110 through one or more of the satellites 106, 108 and a fixed antenna 112 in communication with the user devices 110. The wireless communications may take place at any suitable frequency, such as but not limited to, Ka band and/or Ku-band frequencies. The satellites 106, 108 may be located at different orbital positions and thus the angle relative to a user device may be different.

The user devices 110 may directly receive the signals from the fixed antenna 112. In the present example, the user devices 110 are interconnected through a single wire multiplexer module 114. The single wire multiplexer module 114 communicates with each of the user devices 110A-D to form a network 116. Although wires are implied by network 116, the network may be a wireless network. Further, a single connection between the antenna 112 and a master user device may be established wherein each other of the user devices may be connected to the master user device such as a home media center. The single wire multiplexer module 114 allows each of the user devices 110A-D to independently receive different signals from various transponders of the satellites 106, 108 and communicate the individual signals through the wire using different frequencies. Further, independent control signals such as conditional access packet signals may be independently communicated to each user device 110A-D through the single wire multiplexer module 114. This allows the user devices 110 to be independently controlled.

Each of the user devices 110A-D has an associated receiver identifier (RID) 118A-118D. The RID is a unique identifier. The RID may be an identifier for a conditional access module or other identifier such as a serial number.

The head end 102 may have a billing system 120 associated therewith. In FIG. 1, the billing system 120 is illustrated as separate. However, the billing system 120 may be included within the head end 102. The billing system 120 keeps track of the various user devices 110 and accounts. Each user device 110 has billing data such as a billing address or service address associated therewith. The billing or service address is an authorized location of the user device. The service address may be a street address, a postal code, or both. Each user account has a user device associated therewith. The plurality of receiver identifiers 118A-D associated with a respective user device may be also associated with an account in the billing system.

The head end 102 may communicate with the satellites 106, 108 using an uplink antenna 122. The uplink antenna 122 generates a satellite uplink 123 which is received by receiving antennas 124 on the satellites 106, 108. The satellites 106, 108 generate a downlink 125 using a downlink antenna 126. The downlinks 125 may provide regional coverage such as for the Continental United States or provide spot beam coverage for a specific geographic location within a larger geographic area. The downlinks 125 are communicated to the antenna 112.

Various types of data such as security information, encryption-decryption information, expected terrestrial signal identifiers, content, or content portions may be communicated terrestrially or via the satellites 106, 108. A communication network 132 such as the public switched telephone network (PSTN), a terrestrial wireless system, stratospheric platform, an optical fiber, or the like may be used to terrestrially communicate with the fixed user device 110.

Data or content provided to head end 102 from the content provider 104 may be transmitted, for example, via the uplink antenna 122 to the satellites 106,108. Among other things, the example head end 102 of FIG. 1 provides program content to the user devices 110 and coordinates with the user device 110 to offer subscribers pay-per-view (PPV) program services and broadband services, including billing and associated decryption of video programs. Non-PPV (e.g. free or subscription) programming may also be received. To receive the information rebroadcast by satellites 106, 108, each user device 110 is communicatively coupled to a receiver or receiving antenna 112.

Security of assets broadcast via the satellites 106, 108 may be established in a conditional access generator module 140 by applying encryption and decryption to assets or content during content processing and/or during broadcast (i.e., broadcast encryption). The conditional access generator module 140 is illustrated as a separate component but it may be incorporated into the head end. For example, an asset may be encrypted based upon a control word (CW) known to the head end 102 and known to the user devices 110 authorized to view and/or playback the asset. In the illustrated example communication system 100, for each asset the head end 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption. Thus, a user device may be deauthorized by not allowing the user device access to the proper control word.

The control word packet may be generated at the conditional access generator module 140 and communicated from the head end 102 with other control data as a conditional access packet (CAP). The CAP may be used to provide authorization signals, tuning data, instructions, a master identifier, or a trigger signal to trigger the user device to perform and an action such as determining unauthorized use by comparing a master identifier and an expected master identifier.

The conditional access generator module 140 may generate a conditional access packet that includes an expected master identifier that is expected to be received or determined at the user device 110 during an authorization determination. The conditional access generator module 140 may generate the expected master identifier signals using account data after interaction with the billing system 120 to obtain the user or receiver identifiers associated with the user account.

A guide data module 150 may be used to provide program guide data to the user devices 110 through the satellite 106, 108. This is done using various data objects. The guide data module 150 may also provide the expected identifier using the data object. In summary, expected master identifier may be communicated in various ways including, but not limited to, through terrestrial networks, conditional access packets and data objects.

The user device 110 may compare the master identifier signal received or calculated within the network with the expected master identifier received from outside the network such as communicated from the head end. If the master signal identifiers do not correspond, the user device 110 may have been relocated to an unauthorized viewing site. Access to the programming provided by the satellites 106 and 108 may thus be disabled. Details of this are described in detail below.

Figure 2:
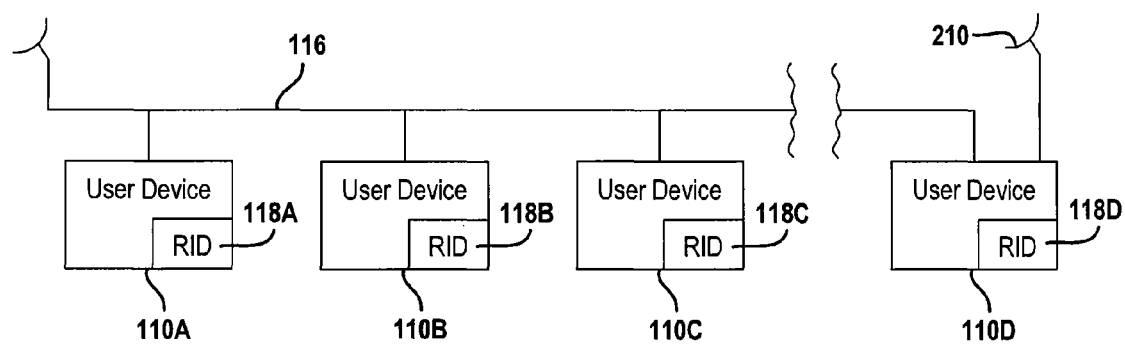
FIG. 2 is a detailed view of the network and an unauthorized user device.

Referring now to FIG. 2, a network 116 is illustrated in further detail having user devices 110A-110D. In this example, the first user device 110D is a user device that should be, but is not, connected directly to the network 116. This is in contrast to the user devices illustrated in FIG. 1 that are all connected to the same network 116. The user device 110D may be coupled to its own fixed antenna 210. The present disclosure allows an exchange of receiver identifiers or a master identifier that is used to determine whether the user device 110D is actually physically coupled to the same network or is placed in an unauthorized location outside of the network 116. An adjacent residence is one example of an unauthorized location.

Figure 3:
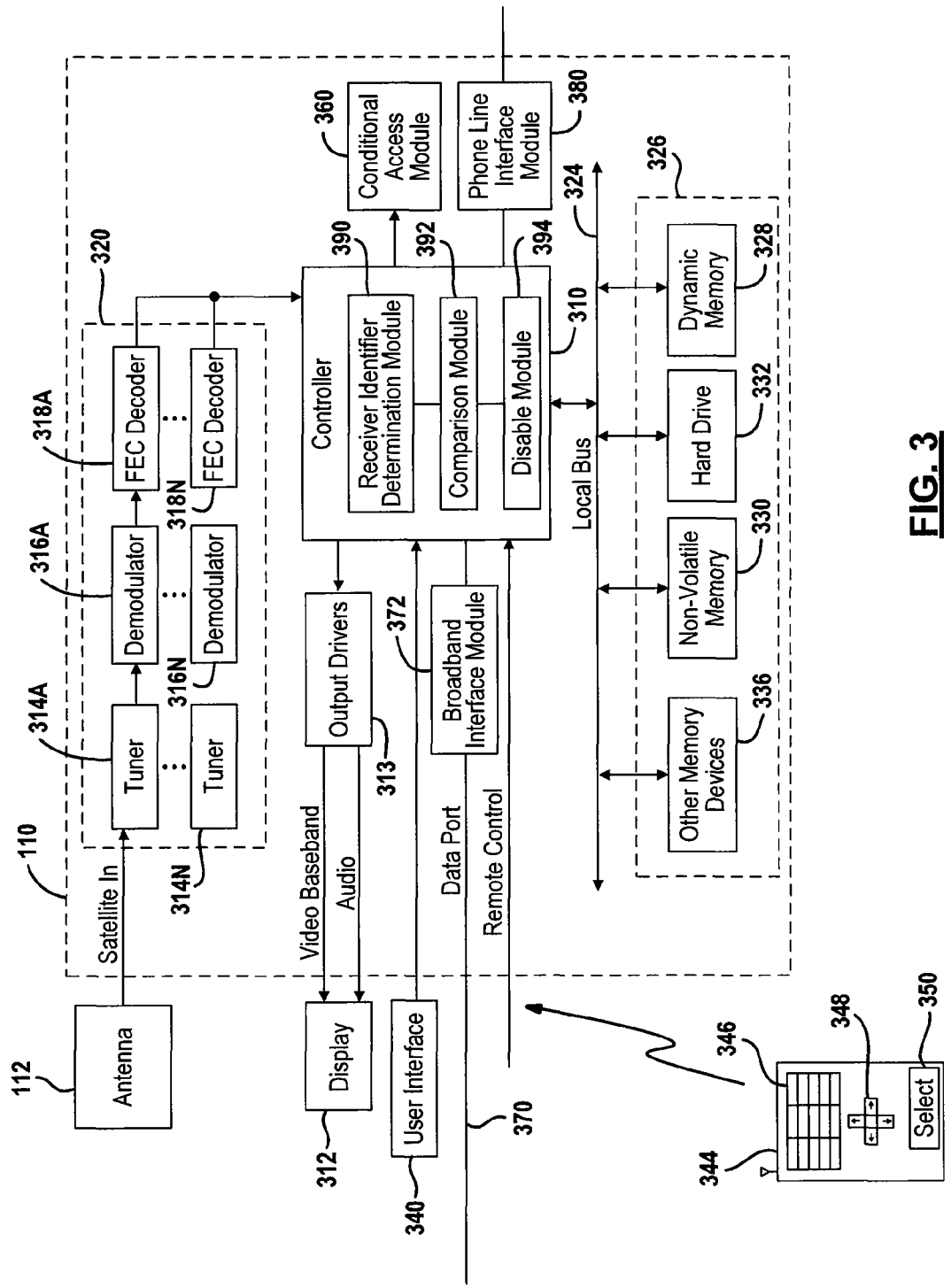
FIG. 3 is a block diagrammatic view of a set top box formed according to the present disclosure.

Referring now to FIG. 3, a user device 110 is illustrated. The user device 110 includes the fixed antenna 124. The user device 110 also includes a controller 310. The controller 310 may control various operations as will be described below. The user device 110 may be in communication with a display 312 through output drivers 313. The output drivers 313 may generate desired audio and video output formats suitable for the particular display device or display 312.

The controller 310 may be a general processor such as a microprocessor. The controller 310 may be used to coordinate the control and the functions of the user device. These functions may include the functions of a receiving circuit 320. The receiving circuit 320 may include a tuner 314, a demodulator 316, a forward error correction (FEC) decoder 318 and any buffers or other functions. More than one tuner, demodulator and FEC decoder may be provided as indicated by the reference numerals "A" and "N". One constructed example may include four tuners, demodulators and decoders, although various numbers of tuners, demodulators and decoders may be provided depending upon the system requirements. The tuner 314 receives the signal or data from the broadcast channel. The signal may include programming content or different types of data including program guide data. The demodulator 316 demodulates the signal to form a demodulated signal or demodulated data. The decoder 318 decodes the demodulated signal to form a decoded data or decoded signal.

The controller 310 is coupled to a local bus 324. The local bus 324 may be in communication with a memory module 326. The memory 326 may be used for storing expected satellite signal identifiers for the authorized location. The memory may include a dynamic memory 328, such as random access memory (RAM) which changes often and whose contents may be lost upon the interruption of power or boot up. The bus 324 may also be coupled to a non-volatile memory 330. One example of a non-volatile memory is an electrically erasable programmable read only memory (EE-PROM). One specific type of EEPROM is flash memory. Flash memory is suitable since it is sectored into blocks of data that may be individually erased and rewritten.

A hard drive 332 may also be in communication with the local bus 324. The hard drive 332 may act as a digital video recorder for storing video and storing various data and various content. The various data stored in the memory 326 may include metadata such as titles, actors, directors, descriptions, posters, identifiers, availability start times, availability end times, pricing data, timing data, program guide data, internal data regarding tuning, search recording and watching recorded content, a receiver identifier, a conditional access module identifier, expected terrestrial signal identifiers for the user device location, and various other types of data. The hard drive may also be interchangeable with another memory device with a large capacity.

Other memory devices 336 may also be coupled to the local bus 324. The other memory devices may include other types of dynamic memory, non-volatile memory, or may include removable memory devices. The display 312 may be changed under the controller 310 in response to data in the dynamic memory 328 or non-volatile memory 330.

The controller 310 may also be coupled to a user interface 340. The user interface 340 may be various types of user interfaces such as a keyboard, push buttons, a touch screen, a voice activated interface, or the like. The user interface 340 may be used to select a channel, select information, change the volume, change the display appearance, or other functions. The user interface 340 may be used in addition to a remote control device 344. The remote control device 344 may include a keypad 346, an arrow keypad 348, and a select button 350. Inputs to the user device may be provided by the remote control device or through the user interface 340.

A conditional access card module 360 (CAM) may also be incorporated into the user device 110. Access cards, such as a conditional access module, may be found in DIRECTV® units. The conditional access card module 360 may provide conditional access to various channels and wireless signals generated by the system. The conditional access card module 360 may control the decryption of program content. Not having an access card or not having an up-to-date conditional access card module 360 may prevent the user from receiving or displaying various video and other content from the system. The conditional access card module 360 has an identifier. The identifier may correspond to the receiver identifier as described above.

The controller 310 may also be in communication with a data port 370. The data port 370 may be a broadband data port that is coupled to the controller 310 through a broadband interface module 372. The broadband interface module 372 may allow wireless or wired communication between external devices with the controller 310. The controller 310 through the broadband interface module 372 may communicate with the internet and various systems such as the head end 102 of the content communication system. Callback signals may be provided through the broadband interface module 372 from the controller 310.

The controller 310 may also be in communication with a phone link interface module 380. The phone link interface module 380 may couple the user device 110 to a public switched telephone network (PSTN). The user device 110 may generate callback signals to the head end through the phone interface module 380.

Callback signals may be provided through the broadband interface module 372, the phone interface module 380 or both. A callback signal may be generated through the broadband interface module 72 or the phone line interface module 380 for communicating data therethrough.

The controller 310 may include a receiver identifier determination module 390. The receiver identifier determination module 390 may determine the receiver identifier signals received.

The controller 310 may include a receiver identifier determination module 390 that may be triggered at various times to monitor the receiver identifier signals and determine unauthorized use of the user device 110. For example, upon initial powering of the user device 110 or receiving a trigger signal, the receiver identifier determination module 390 may receive or listen for receiver identification signals or a first master identifier that is generated within the network. For example, the first master identifier may be generated at a master user device. Monitoring may also take place on a schedule or on a periodic basis.

A calculation or determination of a master identifier may also take place in the receiver identifier determination module 390. The receiver identifier determination module 390 may receive a receiver identifier from each of the other user devices within the network. The master identifier calculated in the receiver identifier determination module 390 may be a secret function of the received identifiers. If one receiver identifier is not included in the calculation, the calculated receiver identifier will not be equivalent to the received or expected master identifier. The secret function may be an addition function, a multiplication function, or other type of function known to both the head end and the user device. The known function may be hidden in one of the memory modules in an encrypted or otherwise obfuscated manner.

The controller 310 may also include a comparison module 392. The comparison module 392 receives the first master receiver signal from the receiver identifier determination module 390 and the expected receiver identifier signals. The comparison module 392 compares the expected master identifier signals with the expected master identifier signal stored within the memory 326 or currently received.

If the received or expected master identifier and the determined or calculated master identifier calculated within the network do not correspond sufficiently, the disable module 394 may be used to generate an error signal used to disable the user device. The disable module 394 may prevent the user device and the components therein from demodulating or decoding the satellite signals. The error signal may be used to generate a screen display on a display device indicating the set top box has been displayed since the location of the set top box does not correspond to the registered location. The error signal may also be communicated to the head end through the terrestrial network so that service personally may be dispatched.

Figure 4:
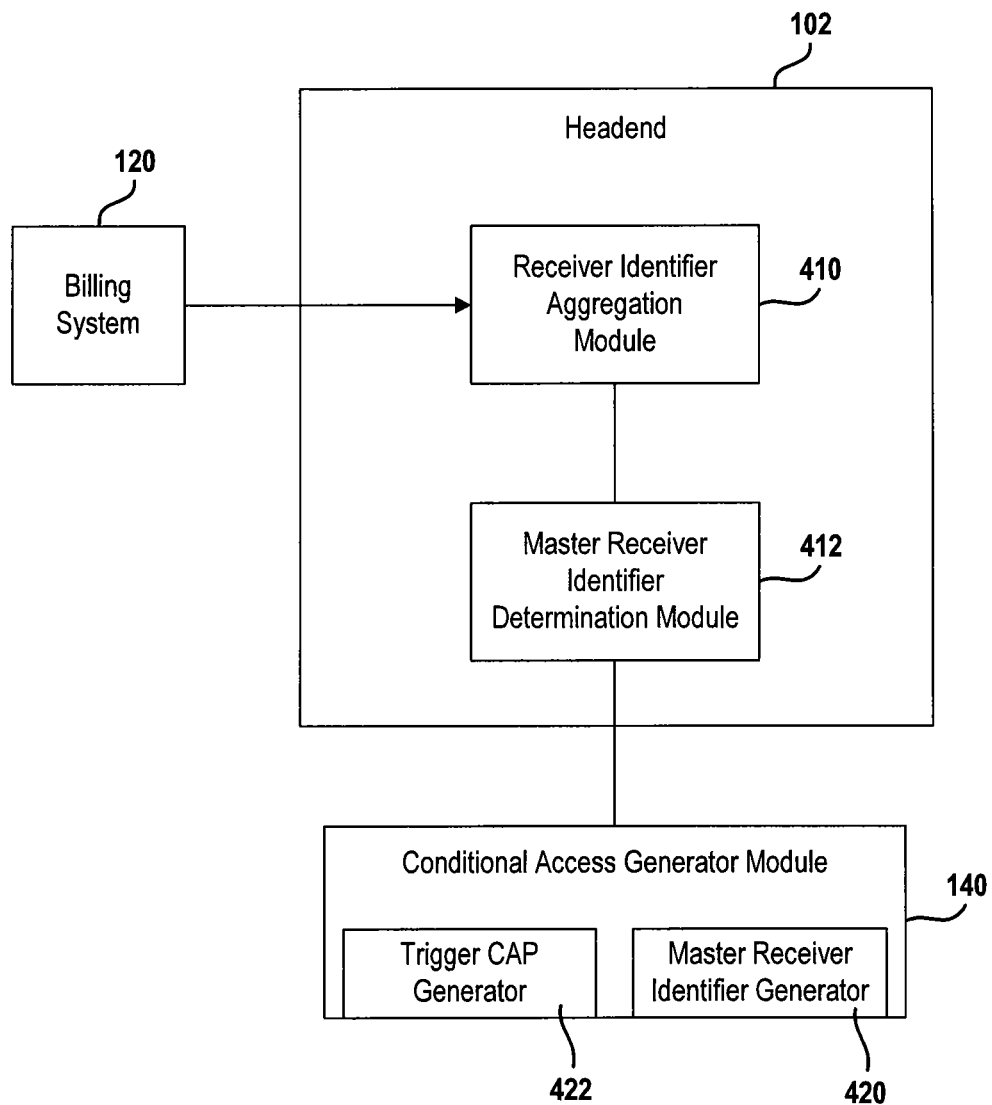
FIG. 4 is a block diagrammatic view of a content processing system according to the present disclosure.

Referring now to FIG. 4, a simplified block diagrammatic view of the head end 102 is set forth. The head end 102 may include a receiver identifier aggregation module 410. The receiver identifier aggregation module 410 may receive receiver identifiers from the billing system 120. The receiver identifier aggregation module 410 may obtain all the receiver identifiers associated with a particular user account. The receiver identifiers are communicated to a master identifier determination module 412. The master identifier determination module 412 may generate a master identifier as a function of each of the receiver identifiers associated with an account. The function used may be the identical function used by the receiver identifier determination module 390 in the controller of the user device. As mentioned above, it is preferable that the master identifier determination module uses a secret function to prevent circumventing the security of the system. The master identifier determination module 420 is in communication with the conditional access generation module 140. The conditional access generation module 140 may generate a conditional access packet signal with a master identifier determination module 420. The conditional access packet may include a master identifier and a user identifier so that the conditional access packet is received by a particular user device. A trigger CAP generator 422 may be used to generate a trigger signal that triggers the user device to perform a comparison from the master identifier and the receiver identifier determined within the user device. The trigger CAP generator 422 may send the trigger signal together in the same CAP as the master identifier or in a separate signal.

Figure 5:
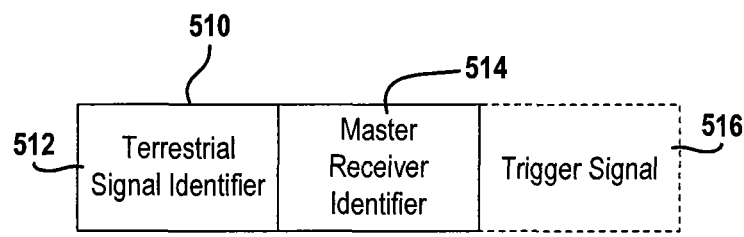
FIG. 5 is a diagrammatic view of a conditional access packet signal having a master identifier.

Referring now to FIG. 5, a conditional access packet 510 includes a user device identifier 512 and a master identifier 514 communicated in the head end 102. As mentioned above, the master identifier 514 may be communicated together with a trigger signal 516. This is an optional signal and is thus illustrated in a dotted box.

Figure 6:
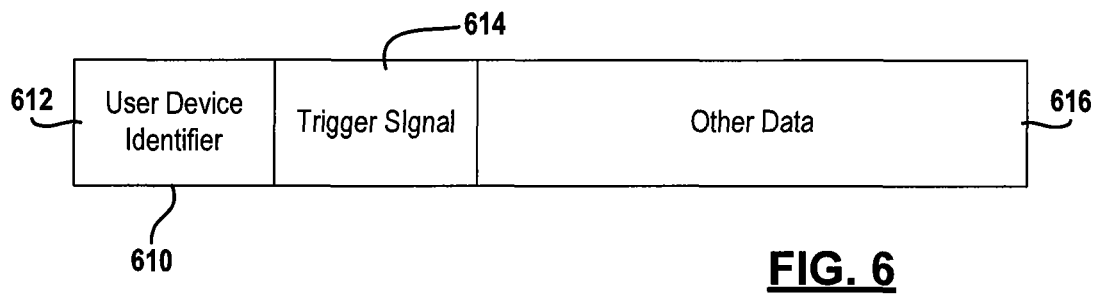
FIG. 6 is a diagrammatic view of a conditional access packet signal having a trigger signal.

Referring now to FIG. 6, the trigger signal may also be communicated in a separate conditional access packet 610. In this example, a user device identifier 612 is communicated with a trigger signal 614. Of course, other data 616 may also be included in a conditional access packet.

Figure 7:
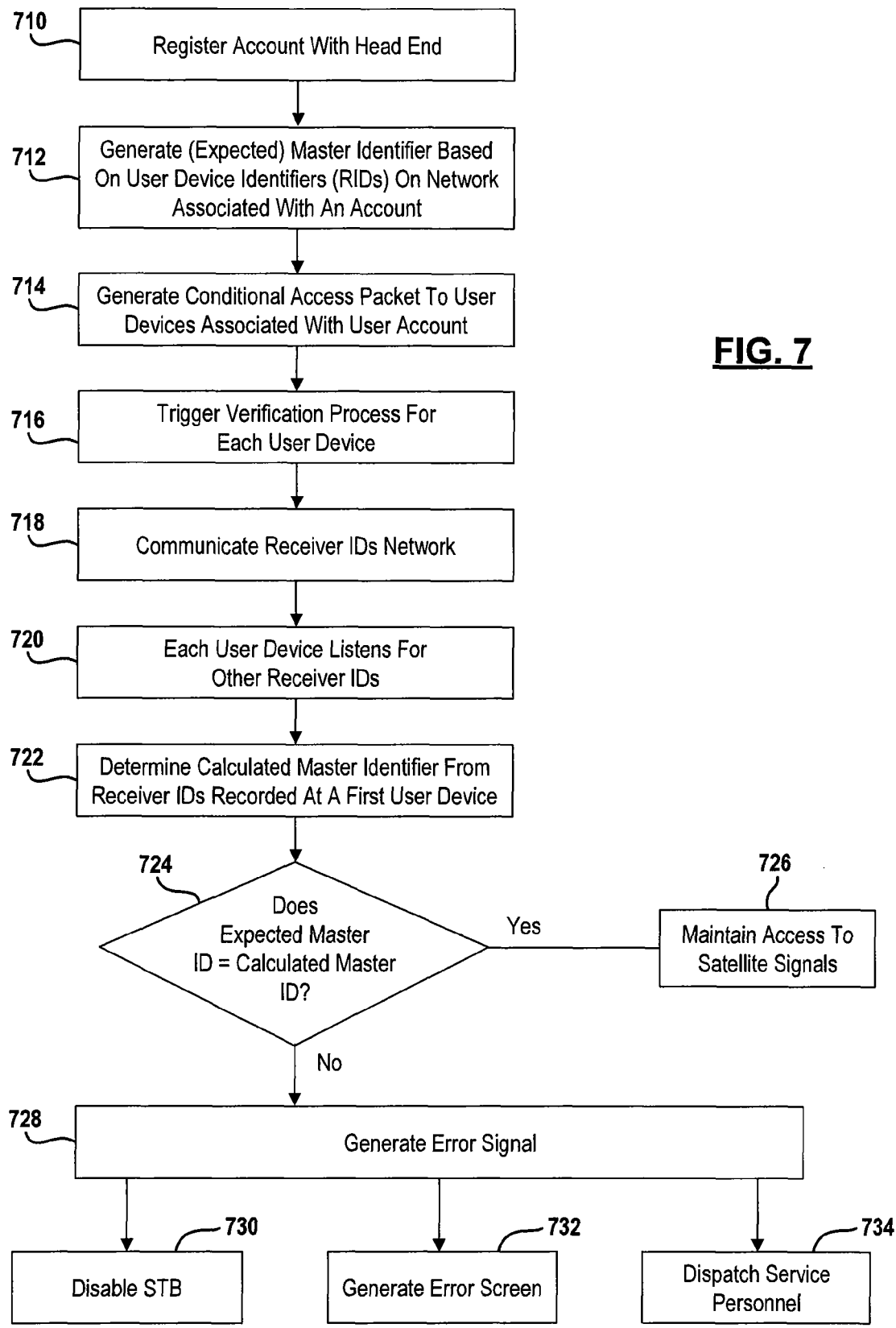
FIG. 7 is a flowchart of a first method of operating the system.

Referring now to FIG. 7, a first method for operating the communication system is set forth. In step 710, an account is registered with the head end. The user devices associated with an account may be activated and authorized by the head end and/or billing system upon initial use or configuration. Authorization may be performed through an authorized dealer or an on-site technician. When a user account is established, the receiver identifiers are provided to the head end.

In step 712, an expected master identifier based upon the set top box identifiers (RIDs) associated with a local area network associated with a particular account is generated. The expected master identifier may be a function of each receiver identifier associated with the user account. This may be performed in the head end as described above.

In step 714, a conditional access packet is communicated to one or all of the user devices associated with a user account. This may take place using individual conditional access packets directed to each user device separately. This may also take place collectively using one conditional access packet addressed to all of the user devices associated with an account. It should be noted that, although each of the user devices within a network are coupled to the same single wire multiplexer module 114 or same network 116, the conditional access signals may be individually addressed to each of the user devices. In step 716, a trigger signal may be received at a user device to trigger a verification process. The trigger signal, as mentioned above, may be received in the conditional access packet with the expected master identifier or as a separate conditional access packet. In step 718, the trigger signal for each of the user devices may trigger each of the user devices to communicate signals through the network. Each communication signal has a receiver identifier associated therewith to identify the source of the signal. The trigger signal may also trigger a user device to listen for signals communicated through the network. In step 718, the user device identifiers (RIDs) are communicated through the local area network. In step 720, each user device listens for other receiver IDs. In step 722, a calculated master identifier is determined as a function of the receiver identifiers received at a first user device. As mentioned above, a secret mathematical function may be used to perform the calculation.

In step 724, when the expected master identifier and the calculated master identifier are equal, step 726 allows the user device to access or maintain access to the satellite signals. In step 724, when the expected master identifier is not equal to the calculated master identifier, step 728 generates an error signal. The error signal may be an internal signal used within the user device. The error signals generated in step 728 may disable the set top box in step 730 or generate an error screen on a screen display associated with the user device in step 732. The error signal may be communicated externally to dispatch service personnel in step 734.

Figure 8:
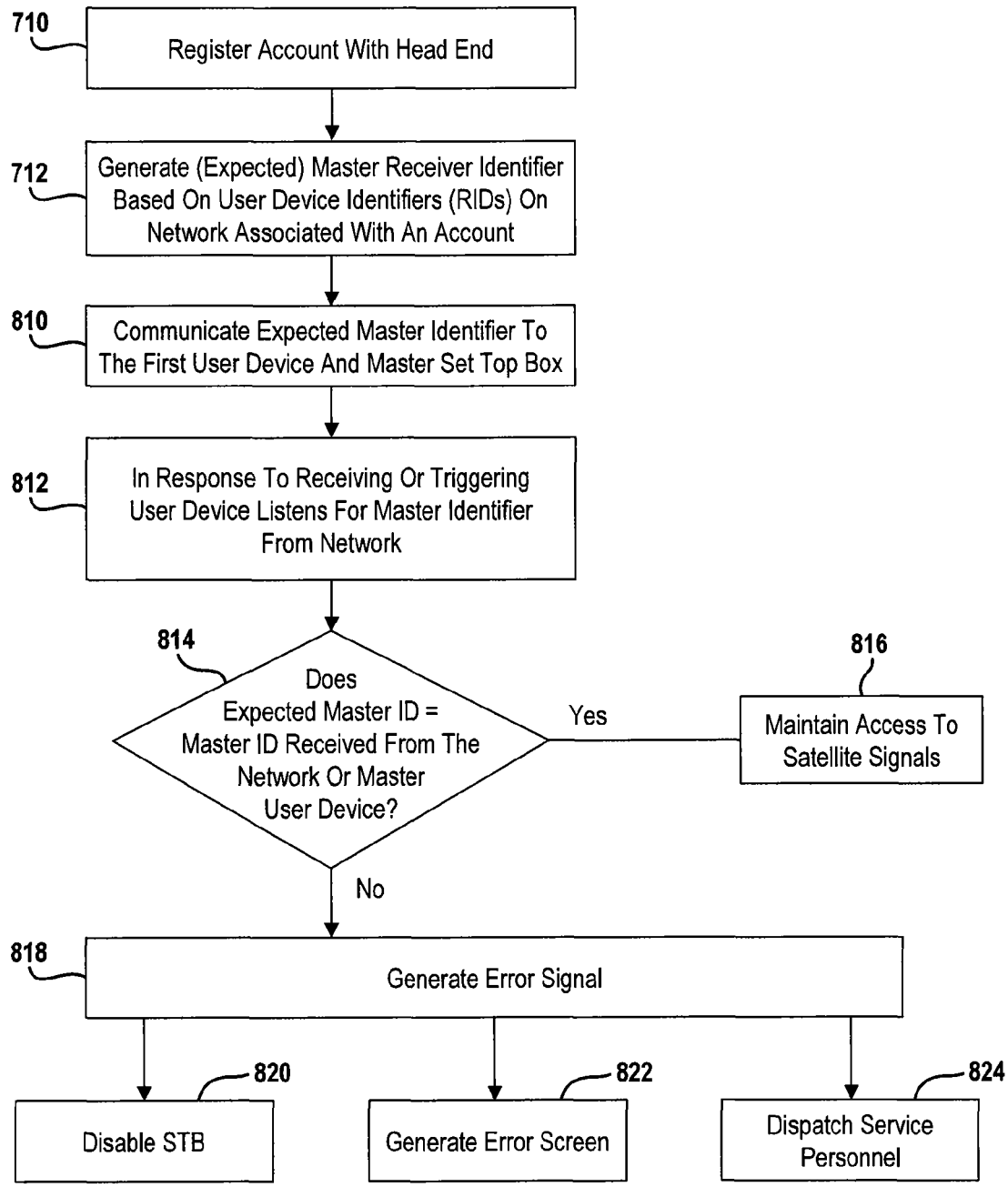
FIG. 8 is a flowchart of a second method of operating the system.

Referring now to FIG. 8, a second method for determining unauthorized use is set forth. In this example, step 710 in which receiver identifiers are associated with an account is performed. As well, step 712 described above relative to generating an expected master identifier is also performed. After the expected master identifier is generated in step 712, step 810 communicates the expected master identifier to the device or devices within an account. Also, a master set top box or a second set top box within the network also receives the expected master identifier. In response to receiving the expected master identifier or upon a trigger signal, step 812 allows the first user device to listen for the master identifier broadcasted through the network. That is, the master user device may communicate an expected master identifier through the network. The user device listens for the master identifier from the network in step 812.

In step 814, the expected master identifier and the master identifier received from the head end at the user device are compared. When the master identifier from the master or second user device of the network and the expected master identifier received directly from the head end are identical, step 816 maintains access to the satellite signal at the user device. In step 814, when the expected master identifier and the master identifier received from the head end are not the same or a master identifier is not received at the first user device through the local network from another user device, an error signal may be generated in step 818. The error signals in steps 818-824 may be generated and operated identical to the error signals generated above relative to steps 728-734 and thus will not be described further.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
generating an expected master identifier for a user account at a head end based on a plurality of receiver identifiers associated with an account;
communicating the expected master identifier to a first user device of a plurality of user devices associated with an account;
receiving the expected master identifier at the first user device;
communicating the plurality of receiver identifiers from the plurality of receivers through a local area network associated with a user account to an identifier determination module located within the local area network;
calculating a first master identifier within the identifier determination module based on the plurality of receiver identifiers received through the local area network;
comparing the first master identifier to the expected master identifier at the first user device; and
generating an error signal at the first user device in response to comparing.

2. The method as recited in claim 1 wherein generating the expected master identifier comprises generating the expected master identifier as a function of all receiver identifiers associated with a user account.

3. The method as recited in claim 1 further comprising prior to comparing generating the first master identifier at one of the plurality of user devices not the first user device and prior to comparing communicating the first master identifier to the first user device.

4. The method as recited in claim 1 further comprising prior to comparing generating the first master identifier at the first user device.

5. The method as recited in claim 1 further comprising prior to comparing generating the first master identifier at one of the plurality of user devices based on receiver identifiers of all user devices associated with an account.

6. The method as recited in claim 1 wherein communicating the expected master identifier to the first user device comprises communicating the expected master identifier to the first user device using a conditional access packet.

7. The method as recited in claim 1 wherein communicating the expected master identifier to the first user device comprises communicating the expected master identifier to the first user device using a terrestrial network.

8. The method as recited in claim 1 wherein communicating the expected master identifier to the first user device comprises communicating the expected master identifier to the first user device using a satellite.

9. The method as recited in claim 1 wherein communicating the expected master identifier to the first user device comprises communicating the expected master identifier to a satellite television receiving device.

10. The method as recited in claim 1 wherein at least some of the plurality of user devices associated with the account are interconnected through a local network.

11. The method as recited in claim 1 wherein at least some of the plurality of user devices associated with the account are interconnected through a network comprising a single wire multiplexer module.

12. The method as recited in claim 1 further comprising triggering the step of comparing in response to a trigger signal.

13. A method as recited in claim 1 wherein generating the error signal comprises generating the error signal when the first master identifier is not equal to the expected master identifier or the first master identifier is not received at the first user device.

14. The method as recited in claim 1 wherein generating the error signal comprises disabling the first user device.

15. The method as recited in claim 1 wherein generating the error signal comprises generating a screen display on a display device associated with the first user device.

16. The method as recited in claim 1 wherein generating the error signal comprises communicating the error signal to the head end.

17. The method as recited in claim 6 wherein the conditional access packet triggers the step of comparing.

18. The method as recited in claim 12 wherein the trigger signal is communicated to the first user device using a conditional access packet signal.

19. The method as recited in claim 12 wherein the trigger signal is communicated to the first user device using a conditional access packet signal comprising the expected master identifier and the trigger signal.

20. A first user device associated with a local network, said local network comprising the first user device and a plurality of user devices with a plurality of receiver identifiers associated with a user account comprising:
- an identifier determination module located in the local network calculating a first master identifier based on the plurality of receiver identifiers received through the local area network;
- a comparison module comparing the first master identifier and an expected master identifier generated outside the local network; and
- a disable module generating an error signal in response to comparing.

21. The first user device as recited in claim 20 wherein a disable module disables the first user device from receiving satellite signals in response to comparing.

22. The first user device as recited in claim 20 wherein the expected master identifier is a function of all receiver identifiers associated with the user account.

23. The first user device as recited in claim 20 wherein one of the plurality of user devices not the first user device generates the first master identifier and communicates the first master identifier to the first user device prior to comparing.

24. The first user device as recited in claim 20 further comprising a receiver identifier determination module generating the first master identifier.

25. A system comprising:
- the first user device as recited in claim 20; and
- a head end.

26. The system as recited in claim 25 wherein the first user device comprises a satellite television set top box.

27. The system as recited in claim 25 wherein the head end communicates the expected master identifier to the first user device set top box through a terrestrial network.

28. The system as recited in claim 25 wherein the first user device comprises a set top box and further comprising a display associated with the set top box, said set top box generating a screen display on the display in response to comparing.

29. The system as recited in claim 25 wherein the head end generates the expected master identifier in response to account data associated with the user account.

30. The system as recited in claim 25 wherein a trigger signal triggers the comparison module to compare.

31. The system as recited in claim 25 wherein at least some of the plurality of user devices are interconnected through a local network.

32. The system as recited in claim 25 wherein the comparison module generates the error signal when the first master identifier is not equal to the expected master identifier or the first master identifier is not received at the first user device.

33. The system as recited in claim 26 wherein the head end communicates the expected master identifier to the satellite television set top box.

34. The system as recited in claim 33 wherein the head end communicates the expected master identifier to the satellite television set top box through a satellite.

35. The system as recited in claim 29 wherein the head end communicates the expected master identifier to the first user device using a conditional access packet.

36. The system as recited in claim 35 wherein the conditional access packet triggers the comparison module to compare.

37. The system as recited in claim 31 wherein the local network comprises a single wire multiplexer module.

38. The system as recited in claim 32 wherein the error signal disables the first user device.

39. The system as recited in claim 32 wherein the error signal generates a screen display on a display device associated with the first user device.

40. The system as recited in claim 32 wherein the first user device communicates the error signal to the head end.

* * * * *